United States Patent [19]
Edqvist

[11] Patent Number: 5,919,028
[45] Date of Patent: Jul. 6, 1999

[54] METHOD AND A DEVICE FOR POSITIONING CYLINDRICAL ITEMS

[76] Inventor: Håkan Edqvist, Mosstorpsvägen 40, S-617 30 Skärblacka, Sweden

[21] Appl. No.: 08/817,024

[22] PCT Filed: Oct. 9, 1995

[86] PCT No.: PCT/SE95/01161

§ 371 Date: Apr. 8, 1997

§ 102(e) Date: Apr. 8, 1997

[87] PCT Pub. No.: WO96/11140

PCT Pub. Date: Apr. 18, 1996

[30] Foreign Application Priority Data

Oct. 8, 1994 [SE] Sweden .................................. 9403444

[51] Int. Cl.⁶ ...................................................... B65G 7/00
[52] U.S. Cl. ............................ 414/754; 198/394; 198/395
[58] Field of Search ............................ 414/754; 198/376, 198/394, 395

[56] References Cited

U.S. PATENT DOCUMENTS

| | | | |
|---|---|---|---|
| 3,580,380 | 5/1971 | Phillips | ..................... 198/376 |
| 3,690,487 | 9/1972 | Evans, Jr. et al. | ........................ 198/394 |
| 4,149,621 | 4/1979 | Sollenberger et al. | .................. 198/395 |
| 4,653,628 | 3/1987 | Claypool et al. | . |
| 5,177,368 | 1/1993 | Kay | ......................................... 250/566 |
| 5,215,180 | 6/1993 | Allard et al. | . |

FOREIGN PATENT DOCUMENTS

| | | |
|---|---|---|
| 2654712 | 5/1991 | France . |
| 3902667 | 8/1990 | Germany . |
| 207941 | 10/1966 | Sweden . |
| 346519 | 7/1972 | Sweden . |
| 1247450 | 9/1971 | United Kingdom . |
| 2213121 | 8/1989 | United Kingdom . |

*Primary Examiner*—Karen M. Young
*Assistant Examiner*—Gregory A Moore
*Attorney, Agent, or Firm*—Ostrolenk, Faber, Gerb & Soffen, LLP

[57] ABSTRACT

A method for rotating and orienting cans in a multipack configuration pushes the cans off a conveyor belt to a scanning and rotating stations where the cans are rotated until the sensors detect that the cans are facing the correct direction. The cans are then shifted back to the conveyor belt. This is useful to prevent unintentional reading of e.g. bar codes on a single item.

15 Claims, 2 Drawing Sheets

METHOD AND A DEVICE FOR POSITIONING CYLINDRICAL ITEMS

BACKGROUND OF THE INVENTION

In today's distribution of e.g. beverages and food in cylindrical cans or bottles, in the text below referred to as cylinders, selling of multipacked products occurs. It happens, during these circumstances, that the multipack does not cover the EAN-code that each separate cylinder has in the multipack. An EAN-code is a bar code, which for example identifies the price of a product and the type of product. This code is used when one separate products is to be sold. At the same time, the multipack has a code, which is intended for the number of items in the multipack, e.g. six beer-cans. Randomly, it occurs that the multipack simultaneously shows two different codes, which both are readable. When handling the multipack at the cash register there is a risk that the multipack is registered as if one single item only has been sold.

This problem has forced forth that e.g. a 12-pack of beer-cans must now be sold in a completely enclosed carton package, which must be seen as a certain waste of resources plus that the consumer is left with the waste.

In order to minimize the quantity of packaging material required, several solutions have been presented to the market. All these solutions have the drawback that the codes on each specific item in the multipack are left fully visable and readable and the risk for errors when handling these multi-packs at the cash register is greater than with the solutions presently used. An example of a multipack with a small quantity of packaging material is described in EP-A-0 496 807, in this text only referred to as a reference.

In order to decrease the amount of packaging material in a good way at the same time eliminating the above problem, each specific can or bottle must be put in such an internal order that the markings, such as the EAN-codes, on the product packages of the cans or bottles are placed between each specific product package in such a way that these codes cannot be read from the outside but only the code on the multipack proper. It is also suitable that the product package is fixed in this position. This can be done with a small amount of adhesive between the product package and the carrying element or that the multipack or product package is so designed that rotation of the cans after the assembling of the carrying element over the product packages is made impossible. Alternatively, the cylinders can be turned so that the codes can be read one after the other.

SUMMARY OF THE INVENTION

The above problem is solved by the invention in that before one or more rows of product packages are provided with a carrying element, the cylindrical objects are rotated and stopped in a predetermined position.

The cylindrical objects, which are provided with a mark or a marking readable by a choosen sensor, are placed upon a surface having low friction against the bottom of each cylinder, respectively. Somewhere on the jacket or the vertical side of each cylinder at least one stop or blocking beam is mounted. On the opposite side of the cylinder in relation to the stop there is placed either at least one rotating wheel or at least another stop. If a rotating wheel is used, this is placed on such a height relatively the stop that rotation of the cylinder can occur, when the distance between the contact-point, or contact-points, of the stop against the cylinder and the contact-point of the rotating wheel against the cylinder is less, or at the most, equal to the double radius of the cylinders, measured horizontally through the centre of the cylinder. The surface of the stop, which is in contact with the cylinder, has low friction, or at the highest, the same friction as the surface of the cylinder, while the rotation wheel has a high friction against the surface of the cylinder.

The distance between the front edge of the stop and the front edge of the rotation wheel is, when placing the cylinders, greater than the diameter of the cylinder. The stop and/or the rotation wheel is then before the actual rotation moved so that the distance becomes less than, or at the most, equal to the diameter of the cylinder, i.e. the front edge of the rotation wheel is pressed against the cylinders.

In such a case, when two stops are used, see above, the rotation wheel must be mounted either in connection with one of the stops or under the bottom of the cylinder. If two rows of cylinders are standing next to each other, one of the cylinder rows can function as a stop for the other cylinder row.

The guidance of the rotation functions in such a way that a sensor, e.g. a photocell, reads a marking on a cylinder. This sensor controls the rotation stop of this cylinder in such a way that it stops the cylinder at the desired position. For each cylinder in a row, where carrying elements are to be mounted, there are a sensor and a rotation wheel. A computer controls each separate pair of sensor/rotation wheel to the desired position. Each cylinder can be programmed to get its own position. A suitable position for the sensor/cylinder marking is close to a stop. The number of cylinders that can be rotated at the same time in a row is suitably a multiple of different, actual packaging sizes. To produce a high capacity in a machinery several rows can be rotated/mounted at the same time, alternatively this is done in a single, elongate row.

The choice of material for the stop and the rotation wheel, respectively, is determined by the demand for as much difference in friction as possible between the stop/cylinder and the rotation wheel/cylinder. Also the size of the contact surface between the stop/cylinder and the rotation wheel/cylinder is adjusted to get the best possible difference in friction. If good conditions in this matter are achieved, the rotation wheel will be able to rotate the cylinder and stop it with a good precision. It is necessary to be able to vary the difference in friction, along with the difference in material, weight, height, etc., with different kinds of cylinders. It is also necessary to be able to vary the placing of both the stop and the rotation wheel from what each separate product demands. For the reasons above, the machine that will be used for these operations is constructed in such a way that the stop and/or the rotation wheel can be moved towards each other, when the cylinders are in position for rotation. Further, the stop must be exchangeable in order to fit different diameters on different cylinders and the rotation wheel must be exchangeable in order to give different friction, diameter and size of the contact surface of the wheel against the cylinder. There can also be other reasons for the change of stop and rotation wheel. Both the stop and the rotation wheel can be adjusted sidewise, lengthwise and vertically. It can occur that the cylinders are moved lengthwise and/or sidewise before or after the rotation takes place.

BRIEF DESCRIPTION OF THE DRAWINGS

The invention will be described in more detail below by means of a preferred embodiment and with reference to the accompanying drawings, in which.

DESCRIPTION OF THE PREFERRED EMBODIMENT

Figure 1:
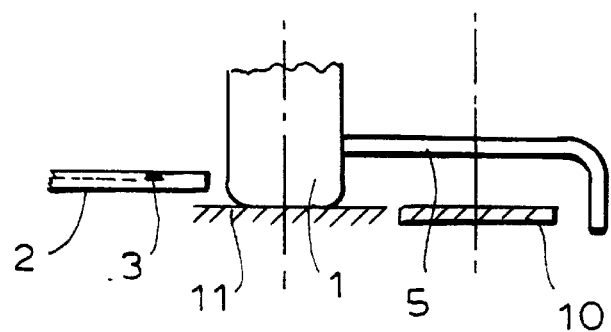
FIG. 1 shows a schematic side view of a device for performing the rotation of the cylindrical objects according to the invention.

As shown in the drawings a device for rotation of three cylinder objects 1, 1' and 1" is shown, according to a preferred embodiment. The drawings also show, with thicker lines, partly integral details, partly the position of the cylinder objects before and during the rotation thereof. According to the preferred embodiment the cylinder objects 1, 1', 1" are displaced 90° to the side relative to the movement direction that they had before the rotation, when they were transported forwards on a conveyor belt 11 in the direction marked with an arrow 6. When alternative embodiments are used, a suitable rotation wheel, which is in contact with the bottom surface of the cylinder objects, can naturally be used or the cylinder objects 1, 1', 1" do not have to be displaced sidewise before or in connection with their rotation.

Figure 2:
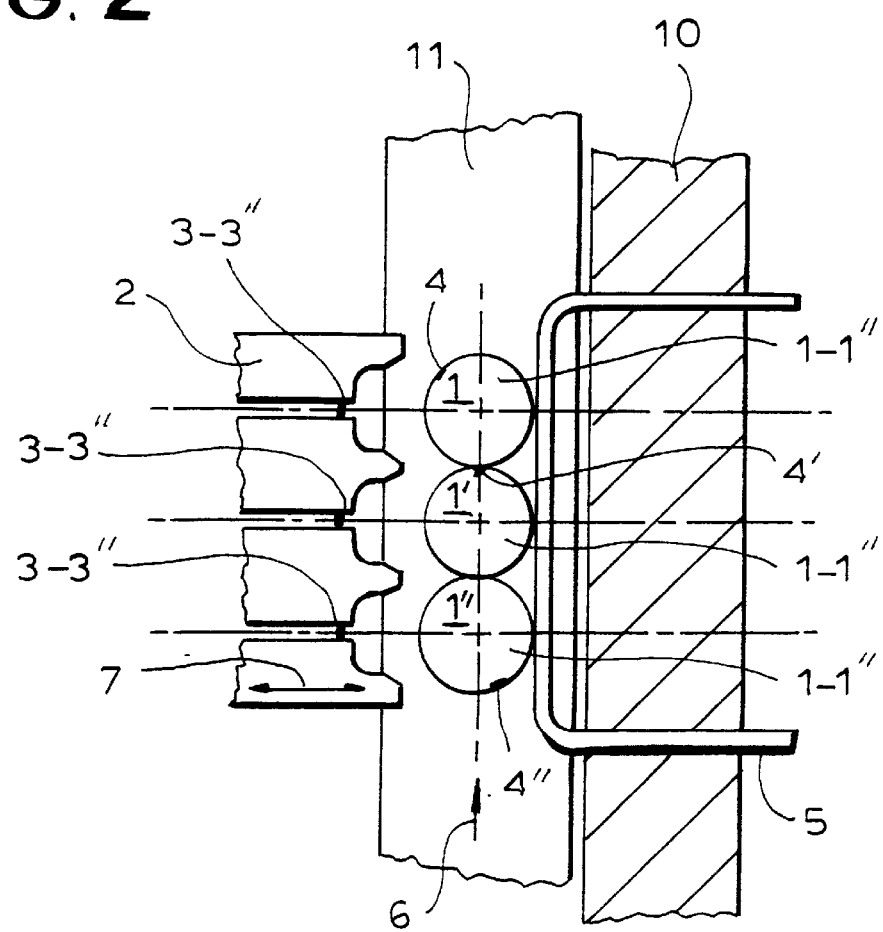
FIG. 2 shows a view from above of the device illustrated in FIG. 1.
Figure 3:
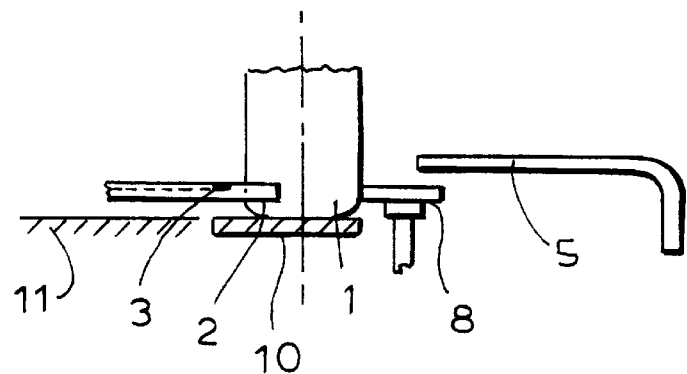
FIG. 3 shows the same view as FIG. 1 but the cylinders have been moved sidewise for rotation and FIG. 4 shows a view from above of the device, where the cylinders are in the position illustrated in FIG. 3, in which they rotate to the desired, mutual position, before the cylinders are fixed in their ready-rotated position by a carrying element.
Figure 4:
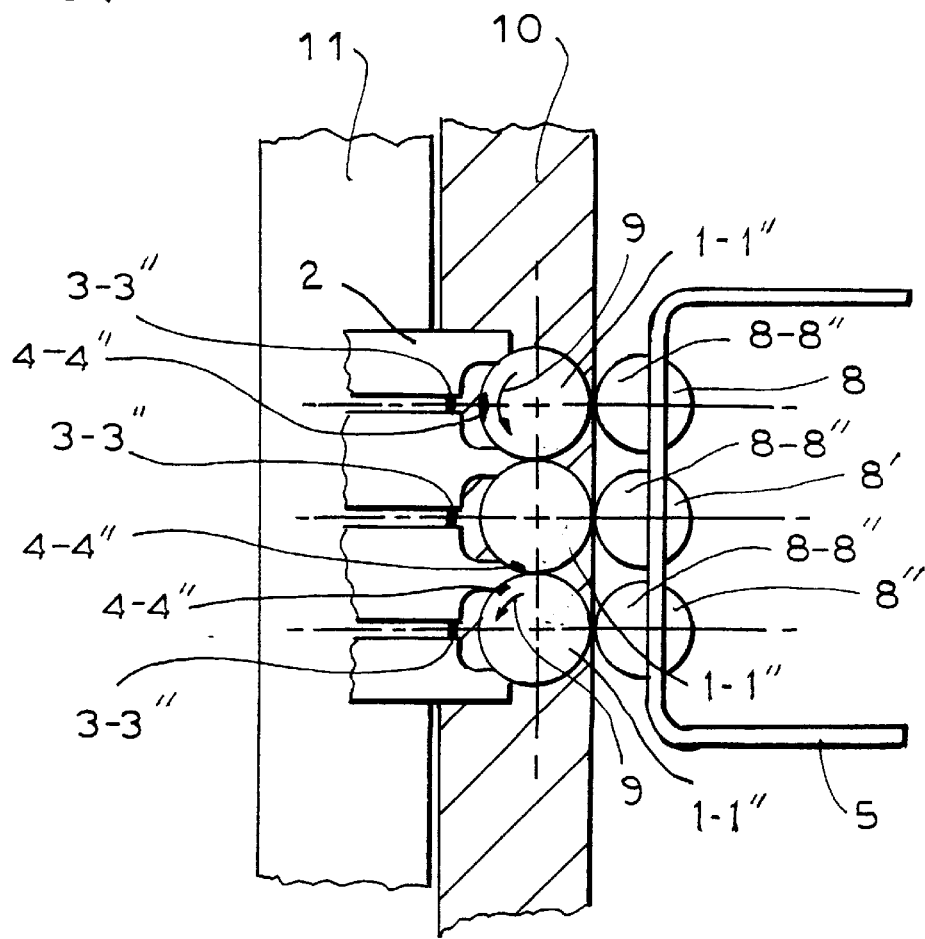

In FIGS. 1 and 2 the cylinder objects 1, 1', 1" are shown in a position, before which a movable stop 2 places them in the position for rotation, which is closer illustrated in FIGS. 3 and 4. FIGS. 1 and 2 also show examples of placing sensors 3, 3', 3", which read the markings 4, 4', 4", which have been placed on the surface area of the cylinder objects 1, 1', 1". Further, a safety and removal beam 5 is shown. This device makes sure that the cylinder objects do not fall over, when being displaced from the position shown in FIGS. 1 and 2, to the position shown in FIGS. 3 and 4. Thereafter the beam 5 takes the cylinder objects back to the starting position on the conveyer belt 11 after rotation of the cylinder objects and mounting of the carrying element having been done. Hereby the cylinder objects are moved back from the position shown in FIGS. 3 and 4 to the position shown in FIGS. 1 and 2. It is, of course, also possible to mount the carrying element over the cylinder objects both before and after the sidewise displacement has occured. It is also possible that the movement of the rotation zone is attained as a continuation of the movement that brought the cylinders into the zone and this provided that the cylinders cannot be moved from their taken position after the rotation.

The direction of the cylinder objects has in FIGS. 1 and 2 been marked with the arrow 6 and the movement of the stop 2 with an arrow 7. In FIGS. 3 and 4 the cylinder objects 1, 1', 1" are shown in their position before rotation. This means that the stop 2 is in its front position. The sensors 3, 3', 3" are activated by the markings 4, 4' and 4" and the movement beam 5 is waiting in its back position. Rotation wheels 8, 8' and 8" rotate and transfer their rotation to the cylinder objects 1, 1' and 1". The sensors 3, 3' and 3" are in different phases. The sensor 3 just reads the marking 4 on the cylinder object 1, the sensor 3' has stopped the rotation of the cylinder object 1' in its intended position and the sensor 3" has not yet read the marking 4" on the cylinder object 1". The direction of rotation of the cylinder objects 1, 1' and 1" is shown with an arrow 9. To get the cylinder objects to rotate more easily they are placed upon a surface 10 having low friction.

A second embodiment of the invention, which is not shown on the drawing, is to move the cylinders perpendicularly towards the lengthwise direction of the row with e.g. a gripping means at the top to a surface provided with a stop. This surface with the stop is moved to the position of rotation and thereafter, without changing the relative position of the cylinders, to a mounting position of the carrying elements in direct connection. This embodiment of the invention differs from the earlier one in that a displacement is attained between rotation and mounting of the multipack.

What is claimed is:

1. A method for positioning cylindrical objects into a multipack with each cylindrical object having a marking thereon, the method comprising the steps of:

moving the cylindrical objects along a conveyor belt;

displacing the cylindrical objects from the conveyor belt to a low friction surface;

rotating the cylindrical objects and scanning the markings thereon; and rotating the cylindrical objects to a predetermined final position.

2. The method according to claim 1, wherein the cylinder objects are stopped during their transport along the conveyor belt and displaced sidewise by a stop a short distance onto the low friction surface, whereupon rotation wheels rotate the cylinder objects to their predetermined final positions, when they are pressed against the stop, the predetermined final positions being dependent on positions of the markings relative to sensors.

3. The method according to claim 2, wherein on a same side of the cylindrical objects where the rotation wheels are placed there is a safety and movement beam, which during the rotation of the cylinder objects prevents them from falling over, and the beam, after rotation, pushes the rotated cylinder objects from the low friction surface to the conveyor belt, after that a mounting of a carrying element is performed.

4. The method according to claim 2, wherein the stop and the rotation wheels are adjustable relative to each other.

5. The method according to claim 1, further comprising the step of:

locking the cylindrical objects into their predetermined positions by a carrying element.

6. The method according to claim 5, further comprising the step of:

returning the locked cylindrical objects to the conveyor belt.

7. The method according to claim 5, wherein the carrying element has a marking thereon which is the only one of the markings of the cylindrical objects and carrying element which is visible from the outside of the multipack.

8. The method according to claim 1, wherein the cylinder objects are locked in their predetermined final position by a carrying element before they are transported further away on a conveyor belt.

9. The method according to claim 1, wherein at least one stop is placed against each cylinder object and opposite thereto at least one rotation wheel with high friction is placed against each cylindrical object in order to individually rotate the cylinder objects distances depending on where each separate cylinder object has its marking along a circumference thereof in relation to one sensor (3, 3', 3") for each cylinder object provided at each stop.

10. The method according to claim 1, wherein the markings of each cylindrical object after being rotated are turned inward relative to the multipack and are not visible from the outside of the multipack.

11. The method according to claim 1 wherein the markings are bar codes.

12. The method according to claim 1, wherein the markings are EAN-codes.

13. A device for positioning cylindrical objects into a multipack with each cylindrical object having a marking thereon, the device comprising:

a conveyer belt along which the cylindrical objects are fed;

at least one stop on each side of the conveyer belt;

sensors positioned in proximity to the cylindrical objects; and at least one rotation wheel opposite each at least one stop to provide rotation of the cylindrical objects to a final predetermined position, which is dependent on the position of the markings on the cylindrical object in relation to the sensors.

14. The device according to claim 13, wherein the stop is movable across the conveyor belt in order to displace the cylindrical objects to a low friction surface situated along the conveyor belt, and the rotation wheels are adjustable in relation to a lateral displacement of the stop in order to reach a position in relation to the cylindrical objects in which they are rotatable between the rotation wheels and the stop.

15. The device according to claim 14 wherein, an adjustable safety and movement beam is located relative to the rotation wheels, the beam being operated after the rotation of the cylindrical objects on the low friction surface, to move the cylindrical objects back to a transport position on the conveyor belt together with the stop.

* * * * *